UNITED STATES PATENT OFFICE.

MICHAEL QUINANE, OF HOBOKEN, NEW JERSEY.

FOOD AND PROCESS OF PREPARING THE SAME.

1,214,218.

Specification of Letters Patent.  Patented Jan. 30, 1917.

No Drawing.  Application filed April 14, 1916. Serial No. 91,079.

*To all whom it may concern:*

Be it known that I, MICHAEL QUINANE, a citizen of the United States, and a resident of Hoboken, in the county of Hudson and State of New Jersey, have invented a new and Improved Food and Process of Preparing the Same, of which the following is a full, clear, and exact description.

This invention relates to the preparation of foods and has particular reference to the composition and method of preparing foods that are intended for future consumption and which may be kept in good condition for an indefinite length of time and served with facility.

A further object of the invention is to provide a food having a well balanced proportion of various bone and tissue building ingredients.

A still further object of the invention is to provide a prepared food composition including a definite proportion of calcium phosphate, a well known tonic and bone builder, there being provided a special method whereby the phosphate is thoroughly mixed or impregnated throughout all the other particles of the composition.

With the foregoing and other objects in view, the invention consists in the composition and means of preparing the same hereinafter more fully and specifically described and claimed.

The process described herein may be carried out in various specific ways so far as the component parts of the food are concerned, but in any event, I employ a novel means and method of applying a preservative for the composition.

In carrying out this invention in a practical embodiment, I employ as the heaviest ingredient, a farinaceous or starchy component, which is preferably the best grade of rice and of about 40% of the mass of the entire composition.

Another main component consists of some material of a more or less bulky nature, which though having some food value in the form of nitrogen, consists otherwise largely as a conveyer for the other properties of the mixture. I prefer to employ for this purpose a high grade quality of wheat bran in the proportion of approximately 32% of the entire mixture.

The third component may be described generically as a solvent or a solution carrying the tonic, stimulant or bone building properties. In preparing this component, I employ water to which is added the purest form of calcium phosphate precipitated. While the proportion of the last-mentioned component may be somewhat varied in different food compositions, I recommend that it should be about 3 per cent. of the entire composition.

The fourth main constituent consists of an oleaginous preservative, and as a suitable suggestion I recommend the best quality of pure olive oil in the proportion of about 7% of the entire mixture.

The process of carrying out this invention may be described as follows: First, the heavy farinaceous or starchy component and the bran are each separately thoroughly cooked slowly until substantially dry. The proper proportions then of these two main components are assembled in any suitable form of receiver or mixer and the solvent or water solution and the preservative are then introduced into the receiver or container, either both at the same time, or one after the other. In this particular step lies one of the chief elements of the invention. The water containing the saccharine matter in solution is heated to convert it into steam and the same is jetted into the container, while the mixing operation is taking place. Likewise the preservative or olive oil is carefully heated to a temperature considerably above the boiling point or approximately to 300° C., in which condition it becomes exceedingly fluid, adapting it to be very minutely broken up by an atomizing appliance through which it is introduced, while hot, into the container. By the foregoing process of introducing the fluid component, every particle of the heavier bodies becomes thoroughly treated and impregnated and the mixture is rendered practically homogeneous.

The commodity thus produced as a marketable composition, preferably is made to include more or less saccharine matter in the form of sugar or molasses and having the function of a sweetener, as well as acting in connection with the oil, as a preservative. Without unduly restricting the invention as to proportions, I suggest that the total amount of the solvent or water mixture above described and saccharine matter should be about 18%. Obviously, the greater the amount of water introduced, the wetter the product will be turned out and by reducing the amount of water sufficiently, the product may be dispensed in a substantially dry or pulverized form.

One of the principal advantages of the food described herein is to provide a convenient and agreeable means of partaking of the calcium phosphate, so well recognized by the medical fraternity as being a preventative of indigestion, as a tonic laxative, and also a blood purifier and bone maker.

The food described herein may be used as a breakfast food, with or without warm water or milk or cream, or may be taken as a desert with sweet whipped cream or the like.

If desired, for exploitation in certain climates, a small percentage of benzoate of soda, as may be permitted by the pure food laws, may be added.

I claim:

1. The herein described food product comprising a plurality of constituents including, first, a farinaceous vegetable thoroughly cooked until dry; second, a coarse vegetable material constituting a filler and conveyer; third, a quantity of calcium phosphate, and finally, high grade olive oil as a preservative, the solution and oil being thoroughly impregnated throughout every particle of the two first mentioned components.

2. The herein described food product comprising the mixture of a vegetable rich in food properties; secondly, wheat bran as a filler and conveyer; thirdly, a solution including small proportions of calcium compound and saccharine matter, and, finally, an oleaginous preservative consisting of pure olive oil to the amount of 7% of the entire product, the same being thoroughly impregnated throughout the other ingredients.

3. The herein described process of preparing foods, the same comprising the following steps: first, the separate thorough cooking of several independent components, one of which is rich in food value while the other consists largely of bulky material as a conveyer; secondly, the assemblage of these two main components after being cooked and thoroughly mixing the same; and, finally, introducing a fluid into the mixture as a hot spray during the mixing operation, whereby the fluid is thoroughly impregnated throughout every particle of the heavier material.

4. The herein described method of preparing a food, the same comprising the thorough cooking until substantially dry, of rice and wheat bran, then the mixing of these two commodities in a suitable container, then spraying into the container in the form of vapor, a fluid comprising water, saccharine matter and calcium phosphate, and finally introducing into the container a preservative oil for thorough impregnation along with the other components.

5. The herein described process of preparing a food, the same comprising the mixing together of certain heavy bulky food components; second, thoroughly mixing the same; third, introducing into the mixture, while in motion, a spray of solution of calcium compound and saccharine matter and also the spray from a highly heated preservative oil.

6. The herein described food composition comprising rice 40%, wheat bran 32%, water solution including a bone-building stimulant and saccharine matter in the proportion of 18%, and olive oil in the proportion of 7%, the water solution and the oil being sprayed into the mixture of the first two components, while hot and thoroughly impregnated throughout the entire mass.

MICHAEL QUINANE.

Copies of this patent may be obtained for five cents each, by addressing the "Commissioner of Patents, Washington, D. C."